United States Patent Office 3,424,276
Patented Jan. 28, 1969

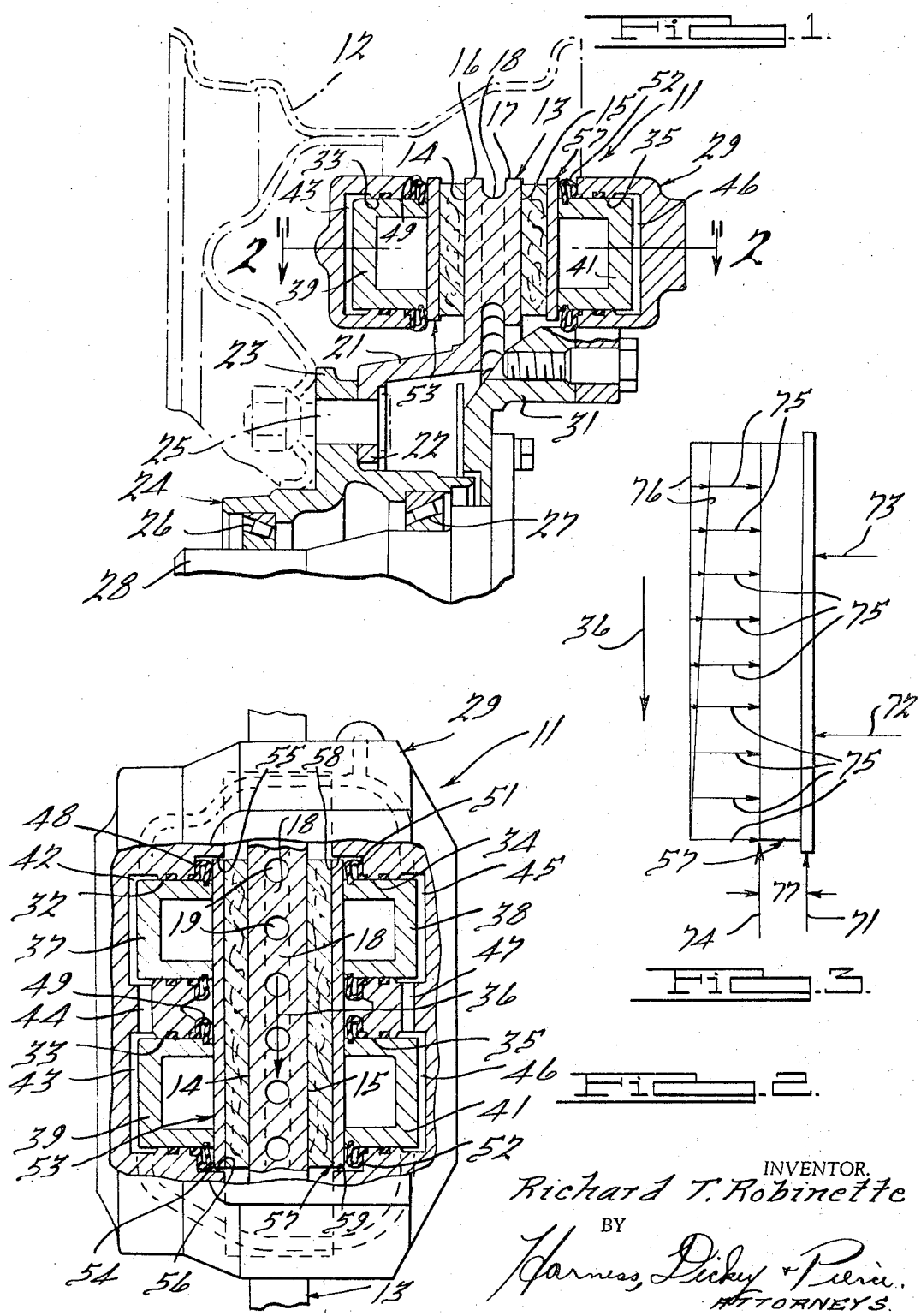

3,424,276
OPPOSED PISTON DISK BRAKE
Richard T. Robinette, St. Clair Shores, Mich., assignor to Kelsey-Hayes Company, a corporation of Delaware
Filed Mar. 3, 1967, Ser. No. 620,352
U.S. Cl. 188—73   5 Claims
Int. Cl. F16d 55/10; B60t 11/10

ABSTRACT OF THE DISCLOSURE

This application discloses a disk brake assembly having a pair of actuating pistons associated with each disk brake pad. The trailing piston is larger in cross sectional area than the leading piston so as to compensate for the servo action, thus maintaining a substantially uniform loading across the brake pad frictional surface.

BACKGROUND OF THE INVENTION

This invention relates to an opposed piston disk brake assembly and more particularly to a disk brake assembly that maintains uniform loading upon the friction pads.

In one common form of disk brake assembly, a pair of pistons are associated with each of the brake pads to bring them into engagement with the rotating disk. Even though servo action is not normally associated with the conventional disk brake in the same magnitude as the well known duo servo shoe type brake, some servo action is nevertheless present. As the friction pad is brought into axial engagement with the rotating disk, it reacts against a fixed abutment member in the brake housing so as to dissipate the rotational energy of the disk. The leading end of the brake pad tends to fulcrum about this fixed abutment resulting in the generation of some servo action. This pivotal movement of the brake pad and the attendant servo action causes the leading edge of the pad to wear at a higher rate than the trailing edge. In addition, certain objectionable brake noises such as brake squeal result.

It is, therefore, a principal object of this invention to provide a disk brake assembly that reduces noise and promotes more uniform wear of the friction pads.

It is another object of this invention to provide an improved disk brake assembly that compensates for the servo action and promotes uniform pad wear.

SUMMARY OF THE INVENTION

A disk brake assembly embodying this invention is particularly adapted for coaction with a rotating disk for dissipating the rotational energy of the disk. The disk brake assembly includes a housing that is affixed against rotation relative to the brake disk and a friction pad that is supported within the housing for axial movement into engagement with the brake disk. The friction pad is restrained against rotation by a reaction surface of the housing. Leading and trailing force applying means are provided to force the friction pad axially into engagement with the disk. The trailing force applying means is displaced from the leading force applying means in the normal direction of disk rotation and is effective to exert a greater force upon the brake pad than the leading force applying means. This difference in a force application compensates for the servo forces acting on the brake pad and more uniformly distributes the braking forces across the face of the pad.

BRIEF DESCRIPTION OF THE DRAWINGS

FIGURE 1 is a cross sectional view taken through a segment of a disk brake assembly embodying this invention.

FIGURE 2 is a cross sectional view taken along the line 2—2 of FIGURE 1.

FIGURE 3 is a schematic free body force diagram showing the braking forces generated upon one of the brake pads.

DETAILED DESCRIPTION OF A PREFERRED EMBODIMENT OF THE INVENTION

In the drawings, the reference numeral 11 indicates a disk brake assembly embodying this invention and particularly adapted for braking a vehicular wheel, shown in phantom and indicated generally by the reference numeral 12. It is to be understood, however, that the disk brake assembly 11 may be used in other applications.

The disk brake assembly 11 is comprised of a rotor 13 having oppositely facing generally radially extending surfaces 14 and 15. The surfaces 14 and 15 are defined by spaced, annular members 16 and 17 that are connected integrally together at spaced circumferential locations by a plurality of radially extending spacer portions 18. Air gaps 19 are formed between the spacer portions 18 adjacent the inner faces of the annular members 16 and 17 to facilitate the dissipation of heat.

The inner end of the member 16 is integrally connected to an outwardly extending flange 21 that terminates in a generally radially extending flange 22. The flange 22 is affixed to an outwardly extending flange 23 of a hub 24 by means of a plurality of circumferentially spaced studs 25, only one of which appears in the drawings. The hub 24 and disk 13 are journaled for rotation by a pair of spaced bearings 26 and 27 on a wheel spindle 28. The wheel 12 is also affixed for rotation with the hub 24 and disk 13 by means of the studs 25 and associated nuts in a known manner.

A brake caliper housing 29 encircles the peripheral portion of the disk 13 and is affixed against rotation with respect to the spindle 28 by means of a supporting bracket 31. A pair of parallel bores 32 and 33 are formed in the caliper housing 29 on the side of the disk 13 adjacent the braking surface 14. In a like manner, a pair of parallel bores 34 and 35 are formed on the opposite side of the caliper housing 29.

The normal rotation of the disk 13 is indicated by the arrow 36 in FIGURES 2 and 3. This is the direction the disk 13 will rotate when the vehicle with which the wheel 12 is associated is traveling in a forward direction, its most normal mode of movement. Hydraulically actuated pistons 37 and 38 are received in the bores 32 and 34, respectively, which pistons functions as the leading pistons when the disk 13 rotates in the direction of the arrow 36. In a like manner, pistons 39 and 41 are supported for reciprocation in the bores 33 and 35, which pistons are the trailing pistons. In accordance with this invention, the leading pistons 37 and 38 and their associated bores 32 and 34 have a smaller diameter than the trailing pistons 39 and 41 and their associated bores 33 and 35 for a reason which will become more apparent as this description proceeds.

Adjacent the termination of the bores 32 and 33 in the caliper housing 29, enlarged pockets 42 and 43 are formed. The pockets 42 and 43 are interconnected by a fluid passage 44. Similar pockets 45 and 46 interconnected by a fluid passage 47 are associated with the bores 34 and 35. Fluid is selectively admitted to the pockets 42, 43, 45 and 46 by any suitable source of hydraulic pressure, as is well known in this art. Flexible boots or seals 48, 49, 51 and 52 encircle the pistons 37, 39, 38 and 41, respectively, to preclude the leakage of fluid past the respective piston.

A friction brake pad assembly 53 is affixed to the outer ends of the pistons 37 and 39 in any known manner. The brake pad 53 has a backing plate 54 that is guided for reciprocation between a pair of oppositely facing shoulders 55 and 56 formed by the caliper housing 29. In a like manner, a brake pad assembly 57 is associated with the pistons 38 and 41 and is guided for reciprocation between oppositely facing shoulders 58 and 59 of the caliper housing 29.

In operation, the brake pads 53 and 57 are normally spaced a very slight distance from the faces 14 and 15 of the brake disk 13. When it is desired to brake the rotation of the disk 13, fluid under pressure from a master cylinder is admitted to the pockets 42, 43, 45 and 46. This urges the pistons 37, 39, 38 and 41 axially toward the disk 13 along with the associated brake pads 53 and 57. When the brake pads 53 and 57 frictionally engage the disk 13, they tend to rotate with it in the direction of the arrow 36. Almost immediately, however, the backing plates of the pads 53 and 57 engage the shoulders 56 and 59 and preclude their further rotation. These surfaces then act as a reaction surface to resist further rotation of the pads 53 and 57 and brake the disk 13.

The forces acting on the brake pad 57 are shown in the free body force diagram (FIGURE 3). It is to be understood that similar forces act on the brake pad 53, but only those acting on the pad 57 will be described in detail. The reaction force generated at the shoulder 59 is indicated by the arrow 71. The force applied by the trailing piston 41 is indicated by the arrow 72 and the force applied by the leading piston 38 is indicated by the arrow 73. The frictional force generated between the face of the brake pad and the adjacent surface 15 of the disk 13 is indicated by the arrow 74. The arrows 75 indicate the unit loading upon the friction pad. The portion of the arrows encompassed between the lines 76 is the amount of this unit loading generated by the servo action upon the brake pad, as will become apparent as this description proceeds.

When the brake pad 57 is brought into engagement with the rotating disk 15, a force couple will be generated upon the pad due to the distance 77 between the point through which the reaction force 71 acts and the point where the pad face engages the disk surface 15 and where the frictional force 74 is generated. This couple creates a servo effect upon the brake pad 57 generating a force loading upon the brake pad indicated by the portion of the arrows 75 between the lines 76. The remaining portion of the unit loading 75 is generated as a reaction from the action of the pistons 37 and 39. If the pistons each exerted a substantially uniform force upon the brake pad, an unequal loading would occur on the pad face due to the couple generated by the forces 71 and 74. In order to maintain a uniform loading, the force 72 exerted by the trailing piston 41 is greater than the force 73 exerted by the leading piston 38. This force differential is achieved by making the piston 41 larger in cross sectional area than the piston 38. The difference in area is chosen so that the loading on the pad face will be uniform in accordance with the mathematical relationship which follows.

Assume the following relationships:

$\Delta F$ = The difference between $F_{73}$ and $F_{72}$ ($F_{73}-F_{72}$)
$F_1$ = A given piston force
$F_{72}$ = Force of piston 41
$F_{73}$ = Force of piston 38
$L_3$ = Overall length of brake pad reaction member
$L_2$ = Distance between $F_{72}$ and $F_{73}$
$L_1$ = Distance from $F_{72}$ to fixed reaction point about which force $F_{71}$ acts
$\mu$ = Lining coefficient of friction
$d_{77}$ = Distance 77

Then the following relationship can be established for the desired $\Delta F$ by a force summation:

$$\Delta F = 2\frac{F_1(L_3-L_1-L_2-2\mu d_{77})}{L_1-L_2}$$

Once the value of $\Delta F$ is determined the appropriate piston forces can be achieved by selecting the appropriate difference in diameter of the respective pistons.

When the disk 13 is rotating in a direction opposite to that indicated by the arrow 36, there will be an unequal unit force experienced upon the brake pads 53 and 57 when they are actuated. This is relatively unimportant, however, since the disk 13 normally rotates in the direction of the arrow 36. In addition, the braking forces present when retarding reverse rotation are generally of a much smaller magnitude than those experienced during forward travel.

While it will be apparent that the preferred embodiments of the invention disclosed are well calculated to fulfill the objects above stated, it will be appreciated that the invention is susceptible to modification, variation and change.

What is claimed is:

1. A disk brake assembly for coaction with a rotating disk for dissipating the rotational energy of the disk, said disk brake assembly comprising a housing held against rotation relative to the brake disk, a fraction pad supported for axial movement relative to the disk and into engagement therewith, said housing and said friction pad having cooperating abutment surfaces for restraining said friction pad against rotation with the disk upon frictional engament therewith, said abutment surfaces being displaced axially from the surface of the disk engaged by said friction pad for imparting a twisting couple upon said friction pad generating a servo force upon engagement with the disk tending to cause uneven wear of said friction pad, and leading and trailing force applying means for forcing said friction pad axially into engagement with the disk, and trailing force applying means being juxtaposed more closely to said abutment surfaces than said leading for applying means, said servo effects on said friction pad thereby being greater upon said friction pad adjacent said leading force applying means than adjacent said trailing force applying means, said trailing force applying means being effective to exert a greater force upon said friction pad than said leading force applying means for compensating for said servo force and for more uniformly distributing the braking force and wear on said friction pad.

2. A disk brake assembly as set forth in claim 1 wherein the leading and trailing force applying means comprise hydraulically actuated pistons, the force exerted upon the brake pad by the trailing piston being substantially greater than the force exerted by the leading piston.

3. A disk brake assembly as set forth in claim 2 wherein the leading and trailing pistons are exposed to substantially the same fluid pressure to actuate the brake, the trailing piston having a substantially larger cross-sectional area than the leading piston to establish the desired force differential.

4. A disk brake assembly for coaction with a rotating disk for dissipating the rotational energy of the disk, said disk brake assembly comprising a housing fixed against rotation relative to the brake disk, a friction pad supported by said housing for axial movement into engagement with the brake disk and restrained against rotation by said housing, and leading and trailing force applying means for forcing said friction pad axially into engagement with the disk, said leading and trailing force applying means comprising hydraulically actuated pistons, said trailing piston being displaced from said leading piston in the normal direction of rotation of the disk, said trailing piston being effective to exert a greater force upon said brake pad than said leading piston for compensating for serve forces acting upon said brake pad and more uniformly distributing the braking forces thereon, said friction pad being restrained against rotation by the housing about a point defined by a reaction surface of the housing displaced from the frictional surface of said paid which engages the disk whereby a force couple is exerted upon said pad, the difference in the forces exerted by the pistons being established in the following relationship:

$$\Delta F = 2 \frac{F_1(L_3 - L_1 - L_2 - 2\mu d)}{L_1 - L_2}$$

where:

$\Delta F$ = The difference in the forces applied by the leading and trailing pistons.
$F_1$ = A given piston force which may be arbitrarily chosen.
$L_3$ = The overall length of the brake pad reaction member.
$L_2$ = The distance between the centers of the leading and trailing pistons.
$L_1$ = The distance between the center of the trailing piston piston and the reaction point.
$\mu$ = The lining coefficient of friction.
$d$ = Distance between the forces of the force couple.

5. A disk brake assembly as set forth in claim 4 wherein the leading and trailing pistons are exposed to substantially the same fluid pressure to actuate the brake, the trailing piston having a substantially larger cross-sectional area than the leading piston to establish the desired force differential.

References Cited

UNITED STATES PATENTS

| 2,937,722 | 5/1960 | Ruet | 188—152.873 X |
| 2,976,956 | 3/1961 | Behles | 188—152.873 X |
| 3,119,468 | 1/1964 | Mossey | 188—152.873 X |

FOREIGN PATENTS 47,881   4/1965   East Germany.

GEORGE E. A. HALVOSA, *Primary Examiner.*

U.S. Cl. X.R.

188—152